Feb. 13, 1945. M. O. TEETOR 2,369,263
PISTON RING
Filed Aug. 1, 1938
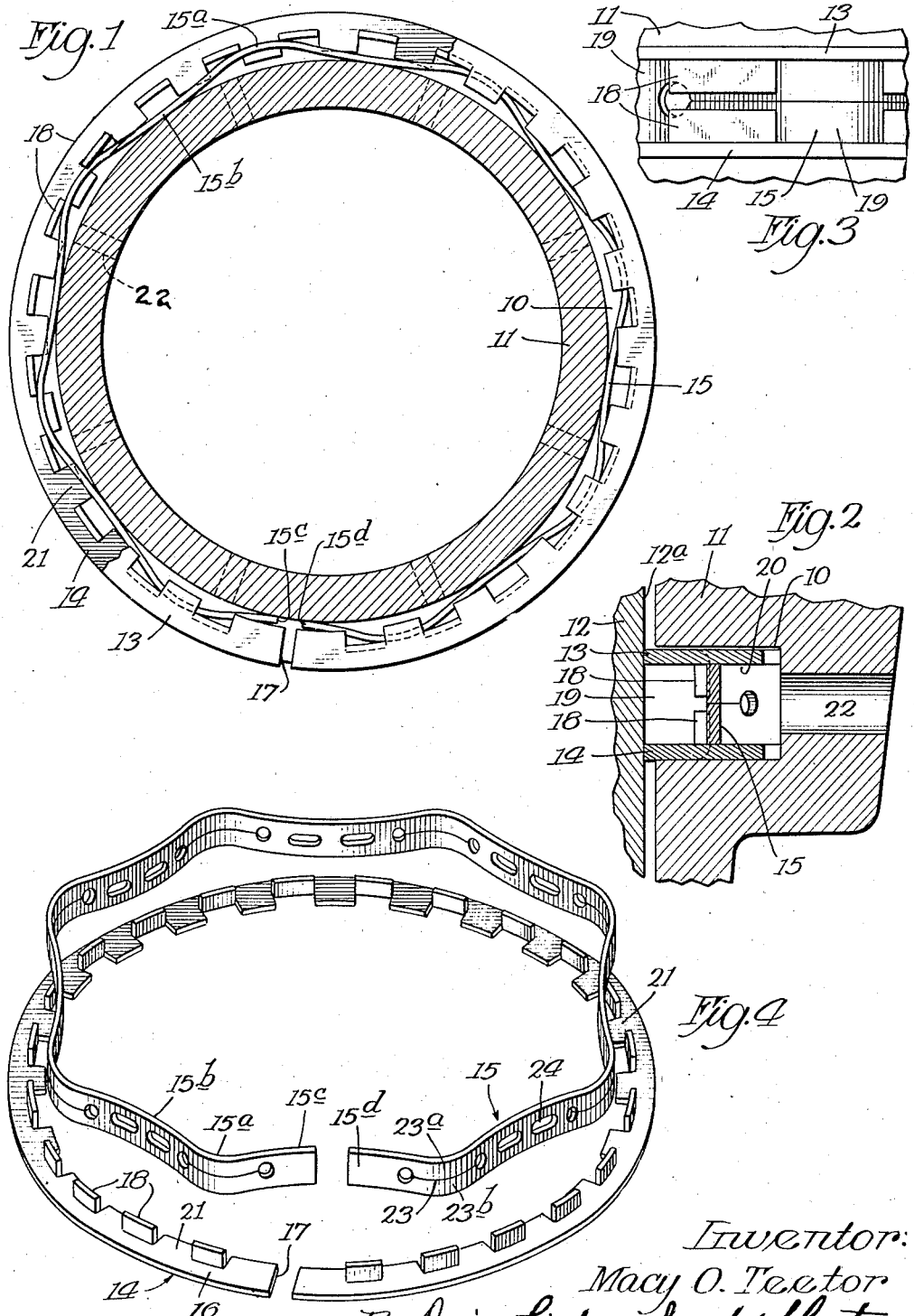
Inventor:
Macy O. Teetor
By Davis, Lindsey, Smith & Shorts
Attys.

Patented Feb. 13, 1945

2,369,263

UNITED STATES PATENT OFFICE 2,369,263

PISTON RING

Macy O. Teetor, Newcastle, Ind., assignor to The Perfect Circle Company, Hagerstown, Ind., a corporation of Indiana Application August 1, 1938, Serial No. 222,325

6 Claims. (Cl. 309—45)

My invention relates to piston ring structure adapted for use in the ring groove in the piston of an internal combustion engine having a cylinder with a wall to be engaged by the piston ring, and it has to do particularly with a multi-part ring of the foregoing character which is especially adapted for preventing excessive oil consumption.

One of the objects of my invention is to provide an improved ring of the foregoing character which is quite simple in construction, may be cheaply manufactured, is durable, is adapted to perform its sealing functions in an efficient manner, and which is particularly useful in worn cylinders.

Another object is to provide a multi-part ring of the foregoing character which includes a pair of split rail sections adapted to engage the cylinder wall and an expander section, said sections being so constructed and arranged that the expander section engages the rail sections to both space them apart in an axial direction and to expand them in radial direction toward the cylinder wall.

Additional objects are to provide a ring of the foregoing character in which the rail sections are formed to provide an oil-receiving channel and an expander receiving channel in the outer and inner faces, respectively, of the ring, the channels being connected radially by oil drainage openings; to provide a ring of the foregoing character wherein the expander takes the form of a crimped band with free ends, the expander and rail sections being interlocked against relative movement with the free ends of the expander substantially aligned with the joints of the rail sections; and to provide a ring so constructed that there is a comparatively deep expander-receiving space between the ring and the bottom of the ring groove of the piston whereby the expander may be made of thicker and stronger material, it may be formed with crimps adapted to accommodate variation in depth of the ring groove while retaining the ability to operate at all times at approximately the same operating pressure, and it will tend to retain its crimped shape during operation with a less critical deflection rate.

Other objects and advantages will become apparent as this description progresses and by reference to the drawing wherein—

Figure 1 is a horizontal sectional view through a piston illustrating one form of my invention mounted in a ring groove thereof;

Fig. 2 is an enlarged, fragmental vertical sectional view of the structure shown in Fig. 1, and illustrating such structure in operating relation with respect to the cylinder wall;

Fig. 3 is a fragmental, front elevational view of the piston ring structure shown in Fig. 2; and Fig. 4 is a partial perspective assembly view of the ring structure shown in the previous figures.

Referring to the drawing, ring structure embodying my invention is adapted to be mounted in the groove 10 in a piston 11 of an internal combustion engine having a cylinder 12 with a wall 12a adapted to be engaged by the ring. The piston ring structure illustrated is of unitary form, including a pair of rail sections 13 and 14 and an expander section 15 which engages the rail sections in such a way as to both space them apart axially in the ring groove 10 and to expand them radially toward the cylinder wall 12a.

The rail sections 13 and 14 are of similar construction, each section having a flat body portion 16 made of thin steel material formed to a ring-like shape split at 17 and so constructed that, in use, its outer edge will normally engage the cylinder wall under its own tension. Each body portion is of a width approximating the depth of the ring groove 10 and it is provided, throughout its circumference, with a plurality of central, circumferentially spaced tongues or axial projections 18 struck inwardly from its body portion at substantially right angles thereto. The projections 18 are of such length that, when the rails are mounted in the ring groove 10 adjacent the sides thereof, as shown in Fig. 2, they do not abut each other. By spacing apart the rail sections 13, 14, as shown, an oil channel 19 of substantial width and depth is formed in the outer face of the ring structure and an expander channel 20 of substantially the same depth is formed on the inner face of the ring structure, and these channels are connected radially by spaces 21 formed by the rail projections 18. Oil collected in the channel 19 during operation will be drained through the openings 21 into the expander channel 20 and thence back to the crank case (not shown) of the engine through piston drain openings 22 leading inwardly from the bottom wall of the ring groove 10.

The expander section takes the form of a flat band of spring steel crimped or otherwise shaped to provide alternating, outwardly and inwardly extending arcuate corners or hump portions 15a and 15b which are adapted to engage the rail section projections 18 and the bottom of the piston ring groove, respectively. The hump portions 15a of the expander band extend into the expander-receiving channel 20 where they engage the rail projections 18 to expand the rail sections 13 and 14 toward the cylinder wall 12ª. The inner edge portions of the rail section bodies 16 engage or seat upon the side edges of the expander band (Fig. 1), which band is of a width sufficient to positively support and space apart the rail sections in an operative position along the opposite sides of the ring groove 10.

The expander 15 is provided with free ends 15ᶜ and and 15ᵈ which are preferably aligned with the joints 17 of the rail sections 13 and 14. The expander humps 15ª are so located relative to the expander ends 15ᶜ and 15ᵈ and to the openings 21 between the rail projections 18 that their apex portions are engaged in certain of the openings 21 thereby interlocking the rail and expander sections with their joints in alignment. It is to be understood that, although I have shown all of the expander humps 15ª extending in part between projections 18, an interlock may be provided by engaging any one or more of the humps between any two or more of the projections. By this arrangement the entire ring structure, including the rail sections 13, 14 and the expander section 15, is free to move in the ring groove 10 as a unit; the expander section 15 breathes, so to speak, in unison with the rail sections 13, 14; and the action of the expander and ring as a whole is improved, particularly under high-speed operating conditions.

It will be seen from the foregoing that the expander section 15 serves as the sole support for spacing apart the rail sections in axial direction. The rail sections are positively spaced apart on their inner circumference and their outer portions are free to move slightly during the operation of the piston, which action, I believe, will improve somewhat the operation of a ring of this character. To further improve the action of the expander 15, the humps 15ª are slitted centrally in longitudinal direction, as at 23, providing independently acting spring portions 23ª and 23ᵇ which engage, respectively, the projections on the upper and lower rail sections 13 and 14. In this way, each rail section is independently expanded toward the cylinder wall 12ª, thereby providing an effective seal between the piston and cylinder wall. The expander portions intermediate the humps 15ª are provided with a plurality of elongated openings 24 through which oil passing through the rail section openings 21 is drained to the back of the piston ring groove 10 and thence to the engine crank case through the piston holes 22.

The objects and advantages of my invention as above first stated will be obvious from the foregoing description. The structure is quite simple and embodies but few parts, all of which have long-wearing characteristics. The ring provides an effective seal which, with its oil-control feature, prevents oil pumping. The ring is particularly well adapted for the performance of these functions in connection with pistons operating in worn cylinders.

The deep expander-receiving space 20 between the rail projections 18 and the bottom of the ring groove affords several advantages. For example, prior expanders necessarily have been formed of very thin material in order to accommodate minimum clearances between the ring and the groove in which the expander is located. This limitation necessarily made the deflection rate of crimp type expanders very critical because after a spring of such type is collapsed to working position it is practically straightened out and the pressure exerted rises at a very fast rate. The deep expander-receiving space that I employ overcomes this difficulty, as illustrated in the drawing. The expander band may be made of much thicker material than expanders heretofore employed, thereby increasing the active life of the expander and improving its general operating characteristics. The expander may be crimped in such a way that it will retain its crimped shape when depressed to working position and during operation. The hump contact points on the expander band may be so designed, as shown, that the area thereof in contact with the ring and with the bottom of the piston groove will not increase materially as the expander is depressed to its working shape. Furthermore, the expander-receiving space available in the use of my invention permits the use of an expander which will accommodate variations in piston ring groove depth, with the expander having the ability to operate with approximately the same pressure at both minimum and maximum groove depth.

I claim:

1. Piston ring structure adapted for use in the ring groove in a piston of an internal combustion engine having a cylinder wall to be engaged, comprising a pair of rail sections each having a thin, flat, split and ring-like body portion with spaced inwardly and axially extending portions defining an annular oil channel in the outer face of the ring and an expander-receiving channel in the inner face of the ring, and a spring, band-like expander disposed in said expander-receiving channel with its side edges engaging said rail section bodies to space them apart in axial direction, said expander being crimped providing certain spring portions engaging said axially extending portions and other spring portions adapted to engage the bottom of the ring groove for expanding said rail sections radially toward the cylinder wall.

2. Piston ring structure adapted for use in the ring groove in a piston of an internal combustion engine having a cylinder wall to be engaged, comprising a pair of rail sections each having a thin, flat, ring-like body portion adapted to be disposed along the opposite sides of the ring groove and of a width approximating the depth of the ring groove, said body portions each having circumferentially spaced, inwardly extending and central projections defining comparatively deep annular channels in the outer and inner faces of the ring, and a spring, band-like expander mounted edgewise in the inner of said channels and having deep humps therein constituting certain spring portions engaging said axial portions and other spring portions adapted to engage the bottom of the ring groove to expand the rail sections radially toward the cylinder wall.

3. Piston ring structure adapted for use in the ring groove of a piston of an internal combustion engine having a cylinder wall to be engaged, which comprises a pair of steel rail sections each having a thin split ring-like body adapted to be disposed along the opposite sides of the ring groove and having outer edges adapted to engage the cylinder wall, circumferentially spaced projections extending inwardly from said body portions, said projections being disposed between the inner and outer edges of said body portions and dividing the ring groove space between said body portions into inner and outer annular channels, and a crimped band-like spring steel expander mounted edgewise within the inner of said channels with its side edges engaging the opposite body portions and constituting the sole means for spacing apart said rail sections in axial direction, the crimps of said expander forming spring portions some of which engage said projections and others of which are adapted to engage the bottom of the ring groove for expanding said rail sections radially toward the cylinder wall.

4. Piston ring structure adapted for use in the ring groove of a piston of an internal combustion engine having a cylinder wall to be engaged, which comprises a pair of thin, split, ring-like rail sections each having a flat body portion with an annular series of spaced, axial projections extending inwardly therefrom, the body portions of said sections being adapted to be disposed along the opposite sides of the ring groove with said projections defining an annular channel in each of the inner and outer faces of the ring structure with radial oil drainage openings therebetween, and an expander section comprising a band crimped to provide hump spring portions adapted to engage the bottom of the ring groove and other hump spring portions disposed in the inner of said channels and adapted to engage said projections for expanding said rail sections toward the cylinder wall, the arrangement being such that the opposite side edges of said expander band engage the opposite rail section body portions to space apart the rail sections in the ring groove, and said band having oil drainage recesses therein in substantially flow alignment with said oil drainage openings.

5. Piston ring structure adapted for use in the ring groove of a piston of an internal combustion engine having a cylinder wall to be engaged, which comprises a pair of thin, split, ring-like sections adapted to be disposed along the opposite sides of the ring groove and each having inwardly and axially-extending, circumferentially-spaced projections defining an annular channel in the outer and inner faces of the ring, and a band-like spring expander mounted in the inner of said channels and having hump spring portions adapted to engage the bottom of the ring groove, the joints of said ring-like sections and the free ends of said expander being aligned with each other, and said expander having other hump spring portions engaging said projections to expand the ring-like sections toward the cylinder wall and also engaging in part between at least two or more of said projections to present relative movement of said sections and expander to maintain said joints and free ends in alignment.

6. Piston ring structure adapted for use in the ring groove of a piston of an internal combustion engine having a cylinder wall to be engaged, which comprises a pair of thin, split, ring-like sections adapted to be disposed along the opposite sides of the ring groove and each having circumferentially spaced and inwardly-extending projections with the projections defining an annular channel in the outer and inner faces of the ring on one section axially aligned with those on the other section, and a band-like spring expander adapted to be mounted behind said projections and having spring portions adapted to engage the bottom of the ring groove and other spring portions adapted to engage the rear surfaces of certain of said projections, and one or more of said latter spring portions being adapted to enter in part the space or spaces between two or more of said latter spring portions.

MACY O. TEETOR.